United States Patent [19]

Black et al.

[11] Patent Number: 4,537,570

[45] Date of Patent: Aug. 27, 1985

[54] LIFTING APPARATUS FOR AN INJECTION MOLD

[75] Inventors: John W. Black, Hickory Corners; Richard D. Shupe; Earl Simon, both of Kalamazoo, all of Mich.

[73] Assignee: Pemco-Kalamazoo, Inc., Kalamazoo, Mich.

[21] Appl. No.: 543,749

[22] Filed: Oct. 20, 1983

Related U.S. Application Data

[62] Division of Ser. No. 243,030, Mar. 12, 1981, Pat. No. 4,424,015.

[51] Int. Cl.³ .......................... B29F 1/00; B29C 3/00
[52] U.S. Cl. .............................. 425/450.1; 425/192 R
[58] Field of Search ............ 425/576, 360, 453, 450.1, 425/451; 264/328.11, 328.8; 74/813 R, 813 L; 294/12, 13, 27.1, 34

[56] References Cited

U.S. PATENT DOCUMENTS

| | | | |
|---|---|---|---|
| 2,093,658 | 9/1937 | Hildenbrand | 294/34 |
| 2,127,038 | 8/1938 | Lehew | 294/34 |
| 2,173,709 | 9/1939 | Campbell | 294/34 |
| 2,327,227 | 8/1943 | Tucker | 425/576 |
| 2,367,991 | 1/1945 | Bailey | 294/34 |
| 2,398,129 | 4/1946 | Bailey | 294/34 |
| 2,613,979 | 10/1952 | Stillabower | 294/34 |
| 3,624,672 | 11/1971 | Spivy | 425/576 |
| 4,111,623 | 9/1978 | Black | 425/576 |

Primary Examiner—J. Howard Flint, Jr.
Attorney, Agent, or Firm—Flynn, Thiel, Boutell & Tanis

[57] ABSTRACT

An apparatus for lifting a mold top upwardly away from a mold bottom includes a support for the mold bottom, a drive for moving the support horizontally, a frame, and a drive for moving the frame vertically. The frame has two gripping arrangements, movement of the support when the frame is in a lowered position causing the mold top to move to a position between the gripping arrangements, the gripping arrangements engaging vertical side surfaces on the mold top. Subsequent upward movement of the frame lifts the mold top due to engagement of the gripping arrangements with lips provided above the side surfaces. The gripping arrangements each include a roller support member pivotally supported on the frame and two rollers supported on each roller support member for rotation about vertical axes, the rollers rolling on the mold top side surfaces.

6 Claims, 14 Drawing Figures

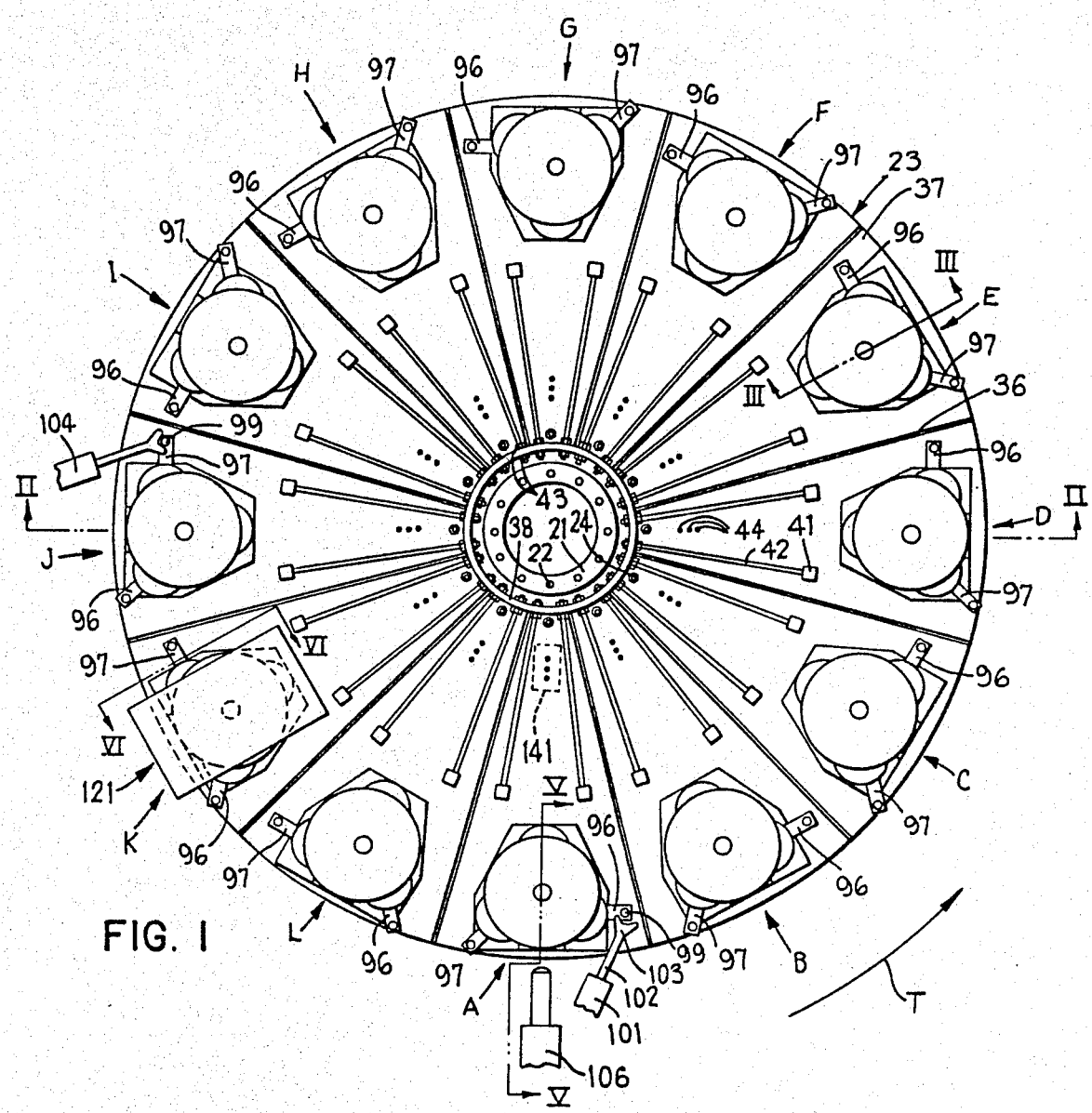

LIFTING APPARATUS FOR AN INJECTION MOLD

This is a division of application Ser. No. 243,030, filed Mar. 12, 1981, now U.S. Pat. No. 4,424,015.

FIELD OF THE INVENTION

This invention relates to an apparatus for injection molding articles from a thermoplastic or similar material, and more particularly, relates to an apparatus for successively aligning each of a plurality of injection molds mounted at spaced intervals about the periphery of a rotatable table with an injection nozzle and for varying the parameters of injection to correspond to the diverse characteristics of the cavities provided in the different molds.

BACKGROUND OF THE INVENTION

It is now a known technique to mount a plurality of injection molds at spaced intervals about the periphery of a rotatable turntable. For example, one such machine is disclosed in my U.S. Pat. No. 4,111,623.

Despite certain advantages inherent in machines of this general construction, they have not proved satisfactory in all respects.

It is a further object of this invention to provide an apparatus, as aforesaid, which includes a simple, inexpensive and efficient mold top lifting arrangement for successively opening the injection molds.

SUMMARY OF THE INVENTION

In general, the objects and purposes of the invention are met by providing a mold top lifting apparatus for lifting a mold top upwardly away from a position adjacent a mold bottom to a position spaced from the mold bottom, the mold top having generally vertical first and second side surfaces facing outwardly on opposite sides thereof and having a downwardly facing lip provided at the top of each side surface. The apparatus includes a movable support which supports the mold bottom and a first drive arrangement for effecting movement of the support in a generally horizontal direction approximately perpendicular to the directions in which the side surfaces on the mold top face. The apparatus also includes a movable frame and a second drive arrangement for effecting generally vertical movement of the frame between a first position and a second position located above the first position. First and second gripping arrangements provided on the frame are spaced horizontally in a direction approximately perpendicular to the direction of movement of the support, movement of the support when the frame is in its first position causing the mold top to move to a position in which it is between the first and second gripping arrangements and in which the first and second gripping arrangements are respectively engaging the side surfaces thereon. Subsequent movement of the frame from its first toward its second position causes the mold top to be lifted upwardly away from the mold bottom due to engagement of the gripping arrangements with the lips on the mold top. The first and second gripping arrangements respectively include first and second roller support members supported on the frame for pivotal movement about respective substantially vertical pivot axes, the first gripping arrangement including two first rollers supported on the first roller support member on opposite sides of its pivot axis for rotation about respective substantially vertical axes, and the second gripping arrangement including two second rollers supported on the second roller support member on opposite sides of its pivot axis for rotation about respective substantially vertical axes. The mold top passes between the first and second roller support members as the support moves, and the first rollers and the second rollers respectively roll firmly across the first and second side surfaces on the mold top just below the lips thereon.

BRIEF DESCRIPTION OF THE DRAWINGS

Further objects and purposes of this invention will be apparent to persons acquainted with apparatus of this general type upon reading the following specification and inspecting the accompanying drawings, in which:

FIG. 1 is a top plan view of an apparatus embodying the present invention;

FIG. 2 is a sectional view taken along the line II—II of FIG. 1;

Figure 4:
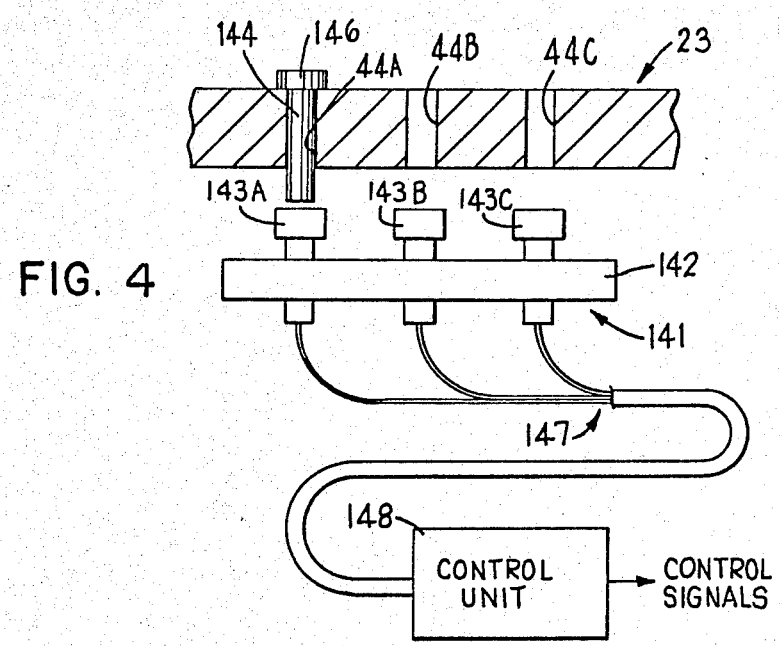
FIG. 4 is a sectional view of a control unit and an indicator and sensor unit associated with an apparatus embodying the present invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words specifically mentioned above, derivatives thereof and words of similar import.

DETAILED DESCRIPTION

An injection molding apparatus 10 is illustrated in FIGS. 1 and 2 and comprises a base plate 11 and a mounting plate 12 mounted on the upper surface of the base plate 11, which mounting plate 12 supports a central upstanding post 13 thereon. The post 13 has a central opening 14 therein and the outer periphery of the post 13 has an upwardly facing lip 17 thereon spaced upwardly from the upper surface of the mounting plate 12.

An annulus 18 encircles the post 13 above the upwardly facing lip 17 and has a pair of vertically spaced bearings 19 disposed between the radially inner surface of the annulus 18 and the outer periphery of the upper portion of the post 13 to rotatably support the annulus 18 with respect to the post 13. The lowermost bearing 19 is supported on the upwardly facing lip 17. The uppermost bearing 19 is held in position between a shoulder on the radially inner surface of the annulus 18 and a plate 21 secured to the post by screws 22.

A table 23 is mounted on the upper surface of the annulus 18 and is secured thereto by a plurality of bolts 24. The table 23, in this particular embodiment, is circular in shape and the plane thereof is generally parallel to the plane of the base plate 11.

An indexing mechanism 26 comparable to the one disclosed in U.S. Pat. No. 4,161,893 is mounted on the mounting plate 12 and comprises a power drive mechanism 27 which drives through a connecting device 28 an annular ring 29 for reciprocal motion about the axis thereof which coincides with the axis of rotation of the annulus 18. The annular ring 29 is connected to the annulus 18 so that the indexing mechanism effects a step-by-step rotating motion of the annulus 18 and the table 23 in the direction of the arrow T in FIG. 1. Thus, in the preferred embodiment illustrated in FIG. 1, the direction of rotation of the table 23 is counterclockwise. For further details of the indexing mechanism, reference is to be made to my aforementioned earlier U.S. Pat. No. 4,161,893.

A table lock mechanism 31 is provided to hold the table 23 stationary during the time interval between each of the aforesaid discrete rotational steps effected by the indexing mechanism 26 and comprises a housing 30 having a chamber 32 therein, which housing is attached to the top of the base plate 11, and a piston 33 received for vertical reciprocal movement within the chamber 32 under control of hydraulic fluid supplied to the chamber 32 by a not-illustrated source. The piston 33 has a vertically extending piston rod 34, the top end of which is successively received in a plurality of recesses 35 provided in the bottom surface of the table 23. Reference to my aforementioned earlier U.S. Pat. No. 4,161,893 will further facilitate an understanding of the lock mechanism 31.

As shown in FIG. 1, the table 23 has a plurality of radially extending slots 36 which divide the table 23 into a plurality of sectors 37. In this particular embodiment, there are twelve such sectors. As the table 23 is rotated in discrete steps, each of the sectors 37 is successively positioned at twelve predetermined locations, which locations are designated in FIG. 1 by the reference letters A to L.

The annulus 18 has a cylindrical hub portion 38 which extends above the surface of the table 23. Two arcuately spaced mounting blocks 41 are secured to each of the table sectors 37 at a point approximately half-way between the hub 38 and the peripheral edge of the table 23. The weight of each table sector 37 is supported in part by support rods 42, each of which extends radially inwardly and upwardly from a mounting block 41 to and through a hole in the cylindrical hub 38 spaced above the table 23, and is fixedly secured in place there by nuts 43 threadedly engaged with a threaded end portion thereof.

As shown in FIGS. 1 and 4, each table sector has a plurality, here three, or radially aligned vertical holes 44 therethrough near the cylindrical hub 38 which are used for a purpose and in a manner described in more detail hereinafter. The actual number of holes shown and described herein is not to be considered limiting.

A plurality of injection molds 46, here twelve, are fixedly mounted on the table 23 at spaced intervals about its periphery. Preferably, as shown in FIG. 1, a single injection mold 46 is mounted on each table sector 37. Each mold is preferably of the type disclosed in U.S. Pat. No. 4,315,727, and a brief description of the mold is given here for convenience. Reference to U.S. Pat. No. 4,315,727 is to be incorporated herein.

Figure 3:
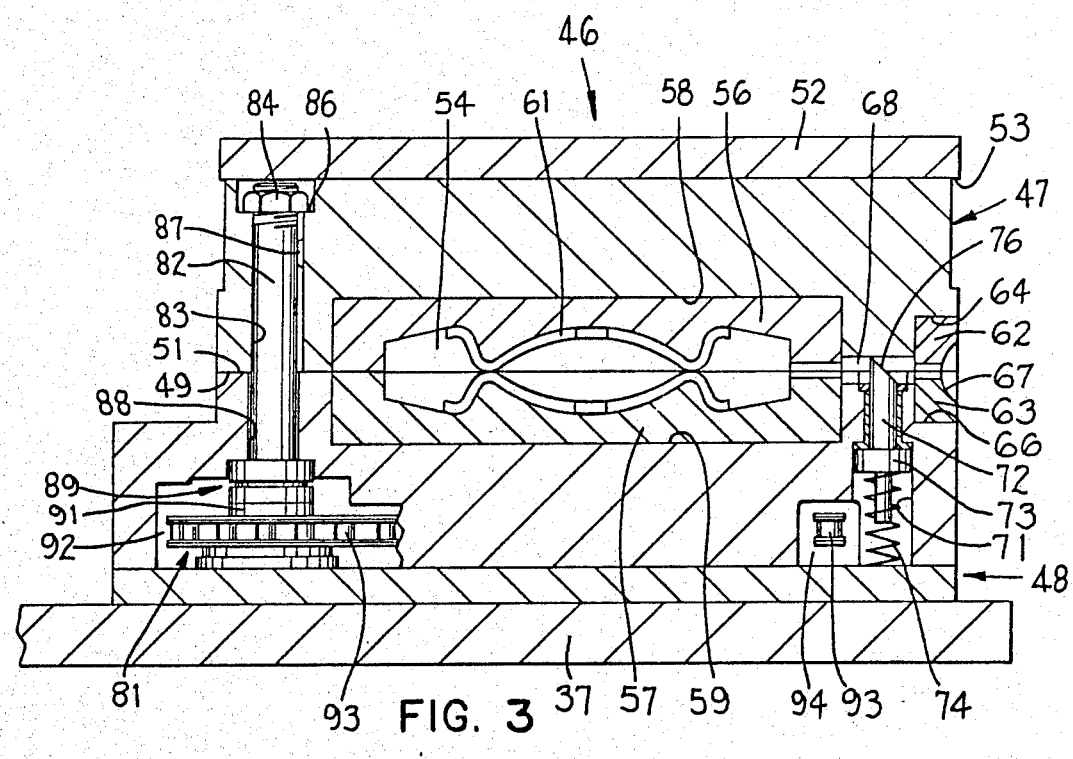
FIG. 3 is a sectional view taken along the line III—III of FIG. 1.

As best shown in FIG. 3, each injection mold 46 comprises an upper mold part 47 and a lower mold part 48. The upper mold part 47 is movable vertically with respect to the lower mold part 48 between a closed position of sealing engagement with the lower mold part 48 and an open position spaced vertically from the lower mold part 48. The vertical movement of the upper mold part 47 relative to the lower mold part 48 is effected by apparatus described in detail hereinafter. When the mold parts 47 and 48 are in the closed position, planar facing surfaces 49 and 51 provided on the mold parts 47 and 48, respectively, are sealingly disposed against each other.

The top of the upper mold part 47 is defined by a top plate 52, which is slightly wider than the rest of the upper mold part 47 so as to form a downwardly facing lip 53. A mold cavity 54 is defined by a pair of cavity plates 56 and 57 disposed in recesses 58 and 59 in the facing surfaces 49 and 51 of the upper and lower mold parts 47 and 48, respectively. In the embodiment illustrated in FIG. 3, the mold cavity 54 is of annular shape and is used to mold an annular tread onto a wheel hub 61 placed between the cavity plates 56 and 57. The mold cavity 54, however, could be any desired shape and different cavities 54 can be provided in the different molds 46 on the table 23.

The upper and lower halves 62 and 63 of a bifurcated nozzle seat are disposed in recesses 64 and 66 at the peripheral edges of the facing surfaces 49 and 51 of the upper and lower mold parts 47 and 48, respectively. The nozzle seat halves 62 and 63 define a surface adapted to mate with a known injection molding machine, which in this embodiment is a substantially hemispherical recess 67. A passageway 68 is defined by grooves provided in the facing surfaces 49 and 51 of the upper and lower mold parts 47 and 48 and connects the nozzle seat recess 67 to the mold cavity 54.

The lower mold part 48 has a vertical bore 71 extending downwardly from the passageway 68. The bore 71 has an upper portion which is substantially the same diameter as the channel 68 and a lower portion having a diameter larger than the diameter of the upper portion. A shut-off pin 72 is slidably disposed within the upper portion of the bore 71 and has an annular flange 73 at its lower end which is slidably disposed within the lower portion of the bore 71. A helical compression spring 74 is supported beneath the shutoff pin 72 in the bore 71 to continuously urge the shutoff pin 72 upwards in the bore 71. The upper end of the pin 72 is defined by a surface 76 inclined at an angle of approximately 45° with respect to the facing surfaces 49 and 51, and oriented to face the nozzle seat halves 62 and 63. When the mold part 47 and 48 are in the closed position, the tip of the pin 72 will be pressed against the top of the passageway 68, such that the inclined surface 76 is entirely blocking the passageway 68.

Each of the injection molds 46 has three locking mechanisms 81, one of which is illustrated in FIG. 3, to firmly lock the mold parts 47 and 48 together when they are in the closed position. Each locking mechanism 81 includes a cylindrical tie rod 82 disposed in a vertical bore 83 in the upper mold part 47. The vertical position of the tie rod 82 in the bore 83 is controlled by a nut 84 threaded on the upper end of the tie rod 82 and disposed against a shoulder 86 provided in the bore 83. Rotation of the tie rod 82 relative to the uppermost part 47 is prevented by a key 87 received in vertical keyways in the cylindrical rod 82 and the bore 83.

When the mold parts 47 and 48 are in the closed position, as illustrated in FIG. 3, the cylindrical rod 82 extends downwardly into the lower mold part 48 where it is slidably received within a bore 88, an annular thrust bearing 89, and a cylindrical lock element 91. The lock element 91 is supported in a lock element recess 92 in the lower mold part 48 for rotation relative to the tie rod 82 about the axis of the tie rod 82, which rotation of the lock element 91 causes the lock element 91 to engage the lower end of the tie rod 82 in a manner not shown to inhibit vertical movement of the tie rod 82 relative to the lock element 91, thereby firmly locking the mold parts 47 and 48 in the closed position. The locking mechanism 81 is released by rotating the lock element 91 back to its original position. A drive chain 93 extends through recesses 94 connecting the recesses 92 and drivingly engages a sprocket wheel provided on each of the lock elements 91 to effect simultaneous operation of each of the locking mechanisms 81 in the injection mold 46. As best shown in FIG. 1, one of the lock elements 91 in each injection mold 46 is provided with a locking handle 96 and another lock element 91 is provided with an unlocking handle 97. Each of the handles 96 and 97 extends out horizontally through an opening 98 in the lower mold part 48 and has a vertical pin 99 affixed to its outer end.

As shown in FIG. 1, a hydraulic locking cylinder 101 is supported adjacent the table 23 at position A. When the piston rod 102 of the cylinder 101 is extended, a Y-shaped element 103 at the end of the piston rod 102 traps the vertical pin 99 on the locking handle 96 of an injection mold 46 positioned at location A and turns the handle 96 in a counterclockwise direction, thereby actuating the locking mechanisms 81 in the mold 46. This movement simultaneously moves the handle 96 counterclockwise. The new position of the handles 96 and 97 becomes apparent from a comparison of the molds at locations L and A. In a similar manner, a hydraulic unlocking cylinder 104 is provided at location J and cooperates with the unlocking handle 97 of a mold 46 positioned at location J to deactuate the locking mechanisms 81. This movement moves the handle 96 clockwise. A comparison of the molds at locations I and J will illustrate the altered positions of the handles 96 and 97 in the unlocked position.

Figure 5:
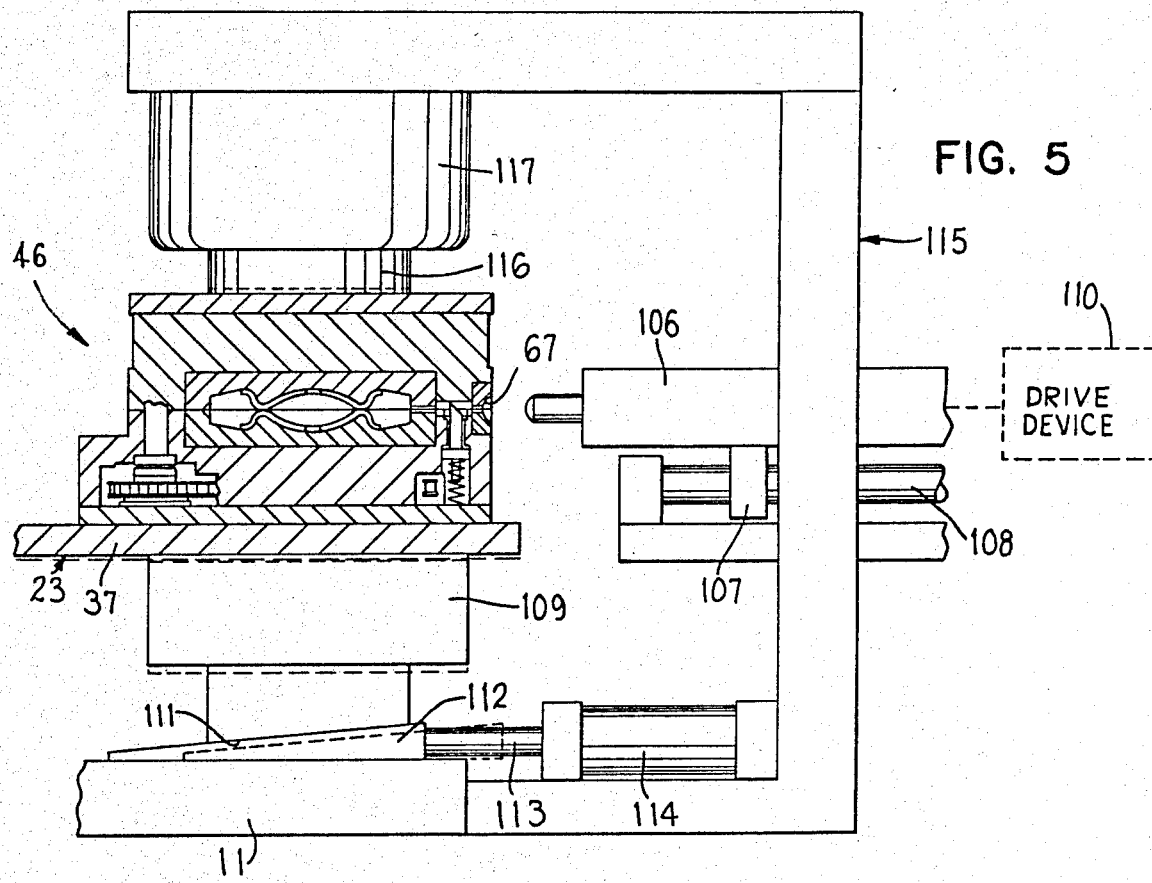
FIG. 5 is a sectional view taken along the line V—V of FIG. 1.

As shown in FIGS. 1 and 5, the nozzle 106 of an injection molding machine is positioned at location A and is slidably supported by legs 107 on a bar 108 for movement radially of the axis of the table 23. Such movement is effected by a conventional drive device 110, which might for example be a hydraulic cylinder.

Beneath the table 23 at location A is an anvil 109 (FIG. 5) supported for reciprocal vertical movement. The lower end of the anvil 109 has an inclined surface 111 which slidingly engages the top surface of a wedge 112 which itself is slidingly supported on the top of the base plate 111. The wedge 112 is connected to the piston rod 113 of a hydraulic cylinder 114 which is mounted on a stationary frame 115, and movement of the wedge to the left or the right under control of the cylinder 114 acts through the inclined surface 111 of the anvil 109 to effect upward and downward movement, respectively, of the anvil 109. The pitch of the wedge 112 is approximately 5°, such that downward forces exerted by the inclined surface 111 of the anvil 109 create only a nominal horizontal force component to act against the operation of the cylinder 114.

Spaced vertically from the anvil 109, above the table 23 and the mold 46, is a vertically movable ram 116 which is the piston rod of a hydraulic cylinder 117 which is mounted to the stationary frame 115. The operation of the anvil 109 and the hydraulic cylinder 114 will be described hereinbelow.

Figure 7:
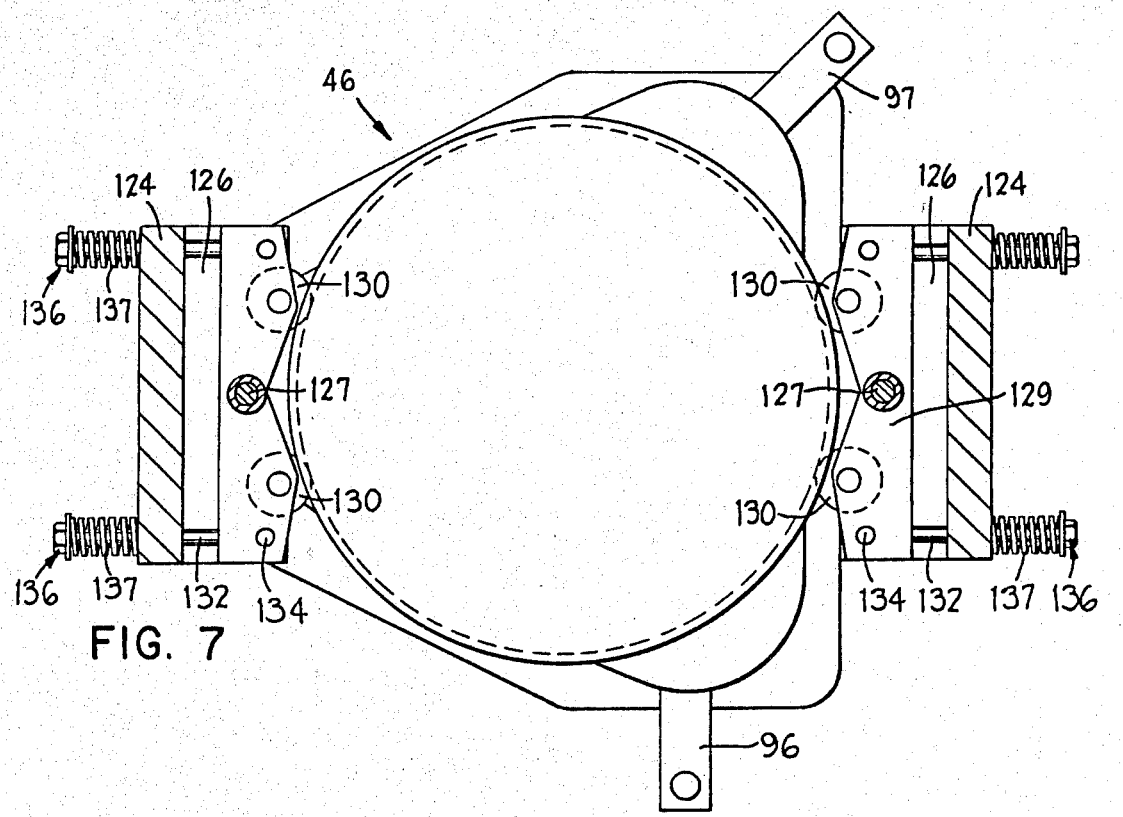
FIG. 7 is a sectional view taken along the line VII—VII of FIG. 6.

A cover lifter 121 is supported above the table 24 at location K of FIG. 1 immediately following the mold unlocking station at location J. The cover lifter 121, as shown in detail in FIGS. 6 and 7, has a C-shaped frame 122 formed by a substantially horizontal top wall 123, two vertical side walls 124 extending downwardly from opposite edges of the top wall 123, and an inwardly extending flange 126 at the bottom edge of each side wall 124. The top wall 123 of the frame 122 is attached to the bottom end of a piston rod 138 of a hydraulic cylinder, schematically illustrated at 138A, to effect reciprocal vertical movement of the frame 122 relative to the table 23 in a manner described hereinbelow.

An elongated vertically extending pivot pin 127 is spaced inwardly from each side wall 124, extends through the top wall 123 and flange 126 and is secured against vertical movement by a washer and a nut 128 threaded on each end and tightened against the top wall 123 and flange 126, respectively. Pivotally supported on each pin 127 a slight distance above the corresponding flange 126 are a pair of vertically spaced roller support bars 129. Spacer elements 127A, 127B and 127C are provided to vertically orient the support bars 129 from the top wall 123, flange 126 and from each other. Disposed between each pair of roller support bars 129 on opposite sides of the pivot pin 127 are a pair of rollers 130 supported for rotation about vertical axes. A vertical pin 134 extends between each pair of roller support bars 129 at each end thereof, and a rotatable sleeve 133 is provided on each pin 134. Each sleeve 133 is attached to one end of a stabilizing rod 132 which extends horizontally outwardly through an opening in the side wall 124 of the frame 122 and has a washer and nut assembly 136 threaded on its other end at a point spaced from the side wall 124. A helical spring 137 encircles each rod 132 and extends between the side wall 124 and the washer and nut assembly 136.

Figure 6:
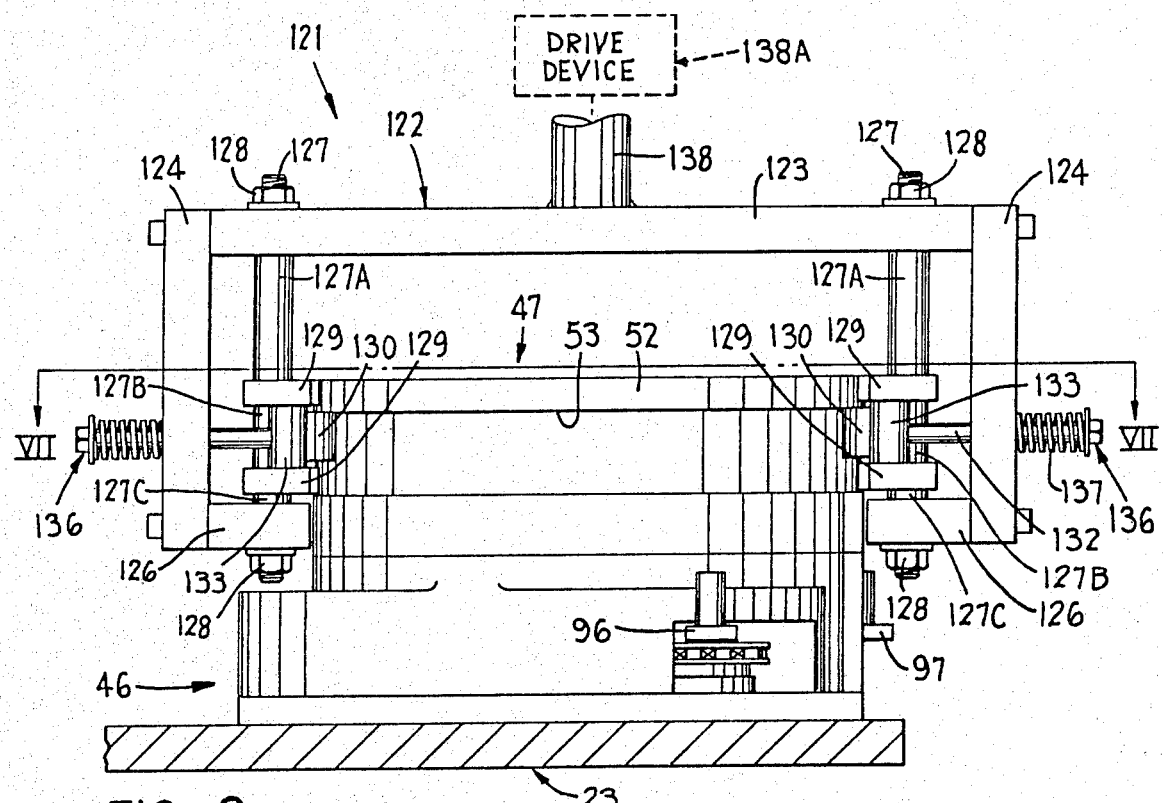
FIG. 6 is a side view taken along the line VI—VI of FIG. 1.

When the piston rod 138 has lowered the cover lifter 121 to its lowest position, as shown in FIG. 6, the upper mold parts 47 of molds 46 rotating with the table 23 will pass at location K between the pairs of roller support bars 129. The rollers 130 protrude inwardly beyond the edges of the roller support bars 129 so as to roll across the side surfaces of the upper mold parts 47 just beneath the lip 53 defined by the top plate 52. The length of the spacers 127A, 127B and 127C can be selectively controlled to adjust the vertical position of the rollers 130 relative to the lip 53. The roller support bars 129 will pivot about the vertical pivot pins 127 against the urging of the springs 137 through the stabilizing rods 132 to the extent necessary to allow the rollers 130 to follow the contours of the upper mold parts 47.

Disposed a short distance beneath the table 23 at location A, as shown in FIGS. 1 and 4, is a sensor unit 141. The sensor unit 141 has a support member 142 supporting a plurality of conventional sensor elements 143A, 143B and 143C, and each element 143A to 143C is disposed beneath the path of travel of a respective one of the plurality of holes 44A, 44B and 44C provided through the table 23. As described hereinabove, the molds 46 provided about the periphery of the table 23 need not have cavity plates 56 and 57 (FIG. 3) with identical mold cavities 54. Accordingly, each of the holes 44 corresponds to a particular one of the possible mold cavities 54 and a pin 144 is placed into the one of the holes 44A to 44C which corresponds to the mold cavity 54 presently mounted in the associated mold 46. In the preferred embodiment described here, the holes 44A to 44C in each sector 37 are associated with the mold 46 on an adjacent sector. Specifically, when a set of holes 44A to 44C is above the sensor unit 141 at location A (FIG. 1), the associated mold 46 will be at location L.

The pin 144 is held in place by the force of gravity and has an enlarged head 146 at its upper end to keep it from dropping through the table 23. If during maintenance procedures a different set of cavity plates 56 and 57 are installed in the associated mold 46, the pin 144 is easily removed from the one of the holes 44A to 44C which corresponds to the removed set of cavity plates 56 and 57 and is then dropped into the one of the holes 44A to 44C which corresponds to the new set of cavity plates 56 and 57.

The one-to-one correspondence between holes 44 and types of mold cavities 54 described above has been selected to facilitate a clear description and understanding of the function and operation thereof, but is not to be considered limiting. It will be recognized that plural pins 144 could be inserted into selected holes in each sector, such as the holes 44A and 44C, in order to provide a coded indication of the characteristics of the associated mold cavity, thereby utilizing a given number of holes 44 more efficiently. Similarly, it will be recognized that the number of holes 44 is not limited to three and a greater or lesser number could be provided in each table sector 37, or that more than one set of holes 44 could be provided in each table sector 37.

Each pin 144 extends a short distance below the table 23, such that the lower end of the pin 144 will pass over the top of an associated one of the sensors 143A to 143C without touching it and each sensor 143A to 143C establishes in a conventional manner a small magnetic field at its top end. When the lower end of a pin 144 passes over one of the sensors 143A to 143C, the pin 144 will interfere with the magnetic field of that sensor and the sensor will detect such interference and send an electrical signal on wires 147 to a control unit 148 which controls the injection molding apparatus 10 in a manner described hereinafter. Alternative schemes can also be used. For example, the lower end of each pin 144 can be highly polished, a light source can be located near the sensor unit 141 and the sensors 143A to 143C can be light-sensitive photooptic devices.

The control unit 148 may be of any type conventionally used to control machine tools, such as a relay circuit, discrete logic components or a microprocessor based control system, commonly known as a programmable controller. A relay circuit illustrating one possible implementation of the control unit 148 is shown in standard relay ladder format in FIG. 9. Certain conventional circuit features have been omitted for convenience, including on-off switches, emergency stop switches and the Master Control Relay.

Figure 9:
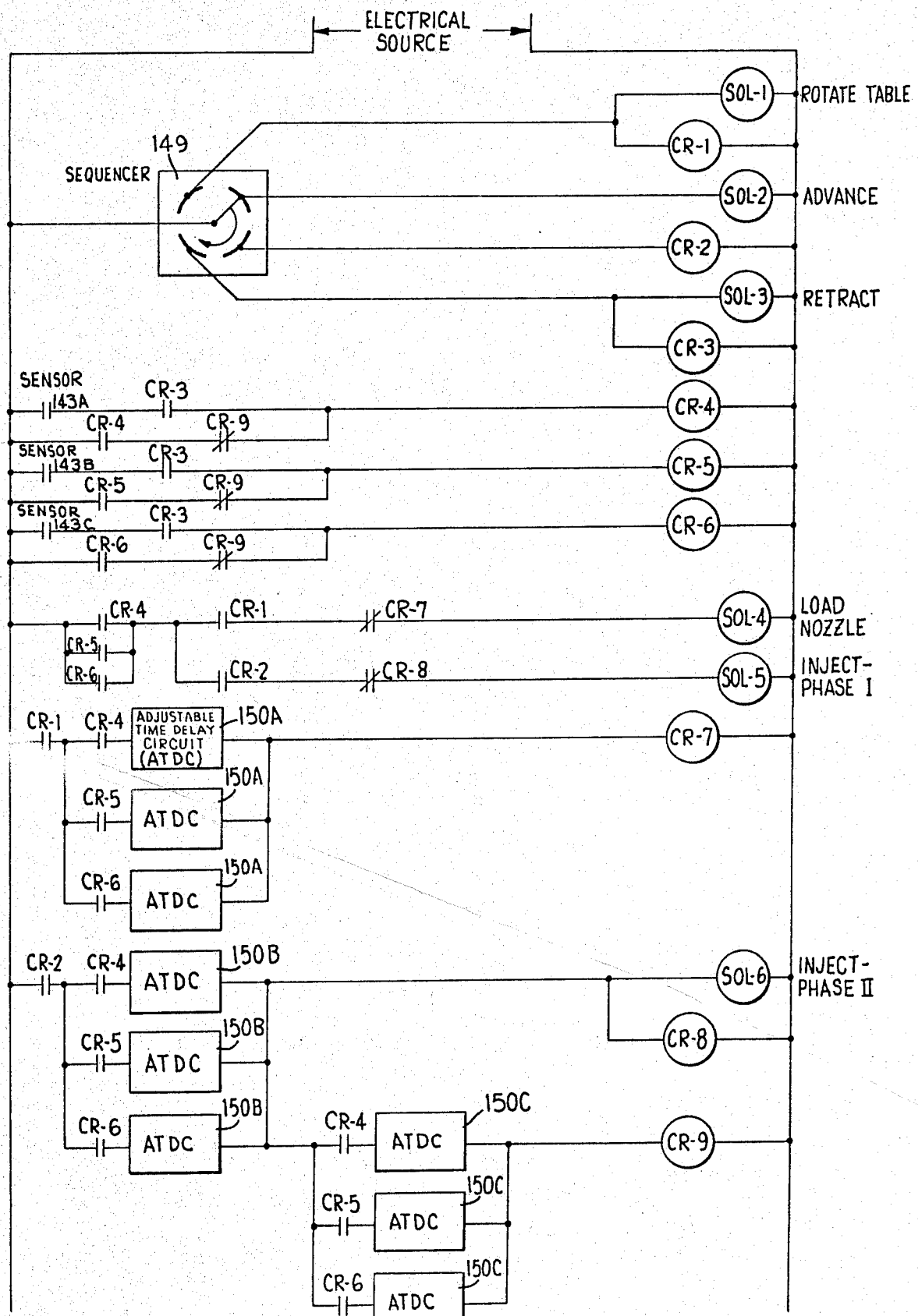
FIG. 9 is a schematic in standard relay ladder format illustrating an exemplary relay circuit for implementing the control unit of FIG. 4.

Referring to FIG. 9, the exemplary control circuit comprises nine control relays, designated CR-1 to CR-9. Referring to FIGS. 4 and 9, the sensors 143A, 143B and 143C provide input signals to the control unit 148 and are respectively wired to the designated contacts in the relay lines which drive control relays CR-4, CR-5 and CR-6.

There are six control signal outputs from the control unit 148, driven respectively by the solenoids SOL-1 through SOL-6. Solenoid SOL-1 (ROTATE TABLE) is wired to the indexing mechanism 26 (FIG. 2) and each time solenoid SOL-1 is energized, the indexing mechanism 26 automatically effects a single-step rotational movement of the table 23, such that each mold 46 is rotated from a respective one of the locations A-L (FIG. 1) to the next sequential location.

Solenoids SOL-2 (ADVANCE) and SOL-3 (RETRACT) are wired to conventional hydraulic valves (not illustrated) which control the hydraulic cylinders 114 and 117 (FIG. 5), the drive device 110 for the injection nozzle 106, the drive device 138A for the cover lifter 121 (FIG. 6), and the hydraulic locking and unlocking cylinders 101 and 104 (FIG. 1). When solenoid SOL-2 (ADVANCE) is energized, the piston rods of the hydraulic cylinders 114 and 117 extend to clamp the mold 46 on the table 23 at location A between the ram 116 and anvil 109, the nozzle 106 is extended into engagement with the hemispherical recess 67 on the clamped injection mold 46, the drive device 138A raises the cover lifter 121 at location K, and the piston rods of the hydraulic cylinders 101 and 104 are extended to respectively effect locking and unlocking of the injection molds 46 at mold locations A and J. When solenoid SOL-3 (RETRACT) is energized, the piston rods of hydraulic cylinders 114 and 117 retract, the drive device 110 retracts the injection nozzle 106, the drive device 138A lowers the cover lifter 121 and the piston rods of hydraulic cylinders 101 and 104 retract.

The solenoid SOL-4 (LOAD NOZZLE) is wired to the injection nozzle 106 and, when energized, enables the loading of a moldable material in a conventional manner into the injection nozzle 106 at a constant rate. The amount of moldable material loaded into the injection nozzle can thus be varied by varying the period of time that SOL-4 is enabled, which variation is effected in a manner described in detail hereinafter. Solenoids SOL-5 (INJECT-PHASE I) and SOL-6 (INJECT-PHASE II) are also wired to the injection nozzle 106. When energized, SOL-5 causes the injection nozzle 106 to inject the moldable material loaded thereinto at an appropriate pressure, typically about 1000 psi, into the injection mold 46 with which it is engaged. After the moldable material is entirely injected into the mold 46, the injection nozzle 106 continues to apply pressure to the moldable material until solenoid SOL-5 is de-energized. Solenoid SOL-6 is energized when SOL-5 is de-energized and causes the nozzle 106 to maintain the moldable material in the mold 46 at a lower pressure than the injection pressure, typically about 500 psi, until de-energized.

The circuit in FIG. 9 also includes a sequencer 149 which may, for example, be a conventional motordriven drum sequencer. The sequencer has four outputs which are respectively wired to SOL-1 and CR-1, SOL-2, CR-2 and SOL-3 and CR-3. As shown in the timing diagram of FIG. 10, the four outputs of the sequencer 149 are sequentially energized in a cyclic fashion.

The control unit 148 also includes nine conventional time delay circuits 150, each of which will energize its output a preset time after its input is energized, which preset time is adjustable, and will maintain its output in an energized state until its input is de-energized. The adjustable preset time delays of the three delay circuits 150A control one parameter of the injection of moldable material into a mold 46 by the injection nozzle 106 in a manner described in detail hereinafter, the three delay circuits 150B control a second parameter, and the three delay circuits 150C control a third parameter. Each of the sensor elements 143A to 143C (FIG. 4) is associated with a respective one of the delay circuits 150A, a respective one of the delay circuits 150B and a respective one of the delay circuits 150C and the preset time delays in these delay circuits are carefully selected to customize the injection operation to the size and shape of mold cavity corresponding to the sensor element.

The interconnections between the various circuit elements of the control unit 148 will be readily understood by reference to FIG. 9 and a detailed discussion of such connections is therefore unnecessary. The operation of the circuit in FIG. 9 is described in detail hereinafter.

Figure 8:
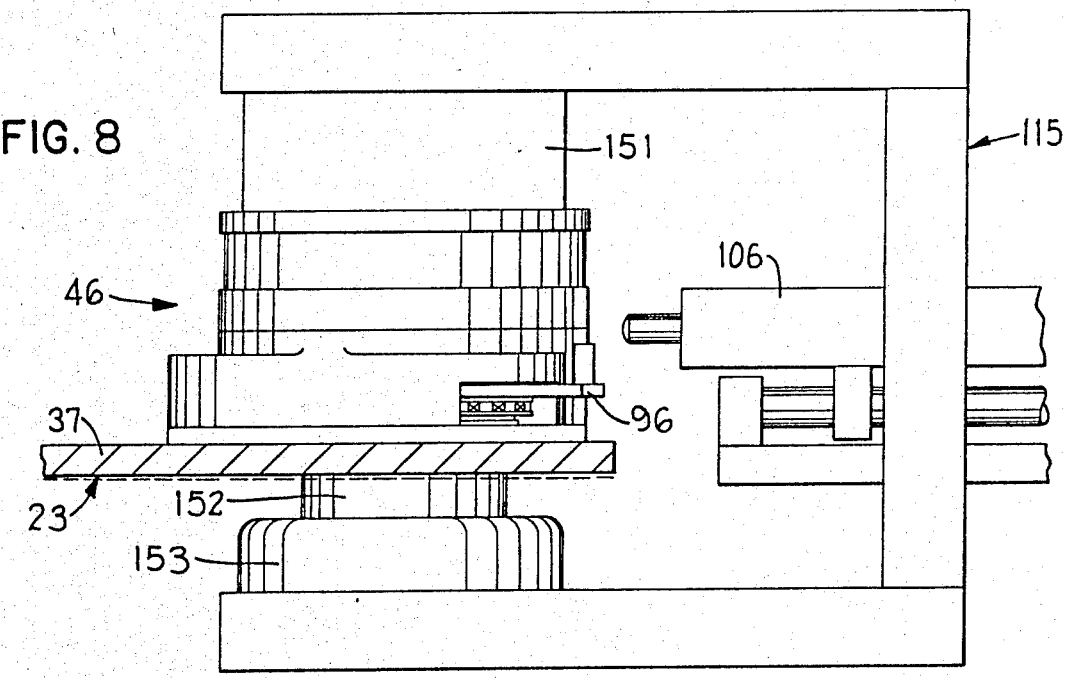
FIG. 8 is a view similar to FIG. 5 showing an alternative embodiment of the apparatus of FIG. 5.

FIG. 8 illustrates an alternative embodiment of the apparatus of FIG. 5. This embodiment differs from that of FIG. 5 in that an anvil 151 is provided above the table 23, rather than below it, and the anvil 151 is securely fixed against any vertical movement. The anvil 151 is spaced sufficiently above the table 23 to allow molds 46 to pass beneath it with a comfortable clearance as the table 23 rotates. Spaced vertically below the anvil 151, beneath the table 23, is a vertically movable ram element 152 which is the piston rod of a hydraulic cylinder 153.

Figure 11:
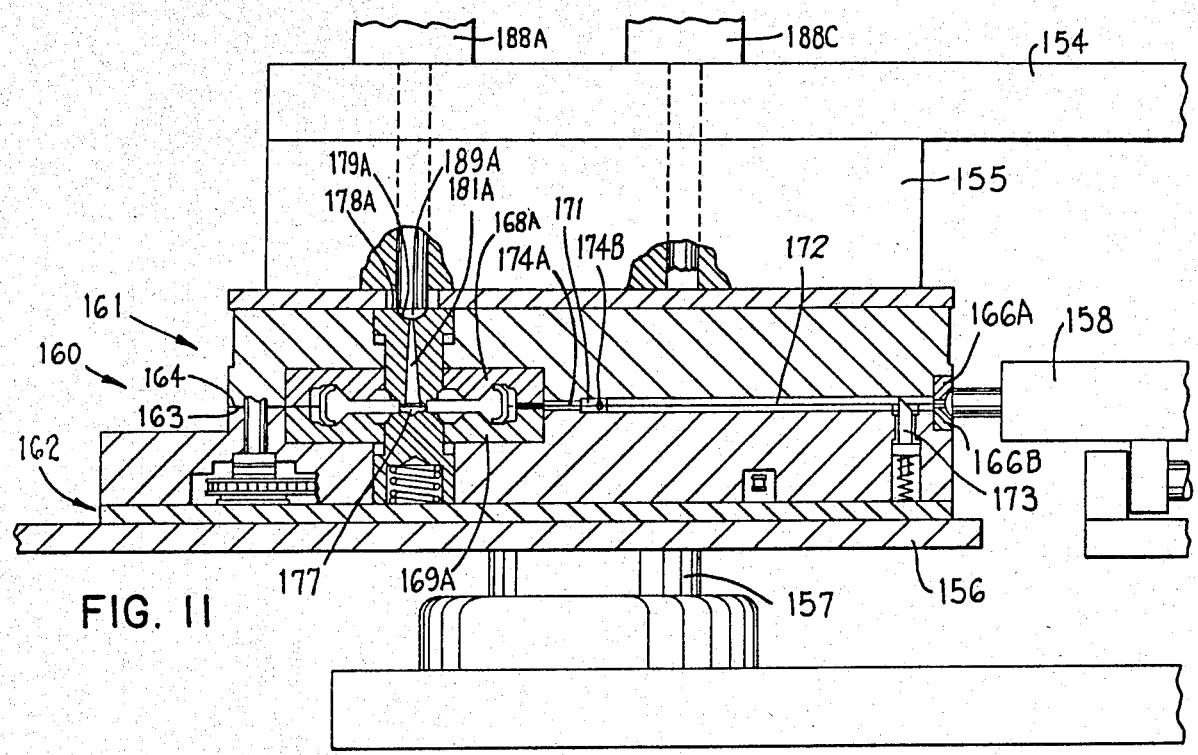
FIG. 11 is a side view, partly in section, illustrating an alternative embodiment of the apparatus of FIG. 8 having plural injection nozzles and a mold with plural mold cavities.

FIGS. 11 to 14 illustrate an alternative embodiment of the apparatus of FIG. 8. In FIG. 11, a frame 154 supports an anvil 155 sufficiently above a table 156 to allow molds 160 mounted on the table to pass therebeneath with a comfortable clearance as the table 156 rotates. A vertically movable ram element 157 is provided below the anvil 155 and beneath the table 156 and an injection nozzle 158 is supported for reciprocal horizontal movement toward and away from the molds 160.

Each of the molds 160 is a three-cavity mold having an upper part 161 and a lower part 162 and having planar facing surfaces 163 and 164, respectively, which are sealingly disposed against each other when the mold parts 161 and 162 are in a closed position. A bifurcated nozzle seat 166 consisting of an upper half 166A and a lower half 166B is provided in recesses in the surfaces 163 and 164 at one side surface of the mold 160. Three interchangeable lower cavity plates 169A, 169B and 169C are provided in recesses in the facing surface 164 of the lowermost part 162. Three upper mold cavity plates 168A, 168B and 168C, only one of which is shown in FIG. 11, are provided in similar recesses in the facing surface 163 of the upper mold part 161 and are each positioned above a respective one of the lower cavity plates 169A, 169B and 169C. Each respective set of mold cavity plates sealingly engage each other to define a mold cavity when the mold parts 161 and 162 are in the closed position. A disk-shaped chamber 171 is defined when the mold parts 161 and 162 are in the closed position by shallow circular recesses provided in the facing surfaces 163 and 164 between the several mold cavity plates 168 and 169 and the bifurcated nozzle seat parts 166A and 166B. A plurality of grooves provided in the facing surfaces 163 and 164 mate when the mold parts 161 and 162 are in the closed position to define a passageway 172 which provides fluid communication between the nozzle seat 166 and the chamber 171 and to define passageways 174A, 174B and 174C which provide fluid communication between the chamber 171 and the mold cavities defined by the respective mold cavity plates 168 and 169. A shut-off pin 173 is provided in the mold 60 and is structurally similar to the shut-off pin 72 described hereinabove for the mold 46 of FIG. 3, the tip of the shut-off pin 173 being resiliently urged into a position substantially obstructing the passageway 172.

Each of the upper mold cavity plates 168A, 168B and 168C has a vertical sprue 177 which, in the preferred embodiment, communicates with the center of the mold cavity. Three nozzle seats 178A, 178B and 178C (FIG. 11) are provided in the top surface of the mold 160, each located directly above a respective one of the sprues 177 and having a respective hemispherical recess 179A, 179B and 179C in the top thereof. Vertical passageways 181A, 181B and 181C respectively provide fluid communication between the recess 179 in each of the nozzle seats 178 and the sprue 177 therebelow. A horizontally reciprocal shut-off pin 187A, which is structurally similar to the shut-off pin 173, is provided in a horizontal bore 186A and has its tip continuously urged into a position substantially obstructing the passageway 181A. The angular orientation of the bore 186A with respect to the passageway 181A is illustrated in broken lines in FIG. 12. Shut-off pins 187B and 187C, not illustrated, are provided in a similar manner for passageways 181B and 181C.

Three injection nozzles 188A, 188B and 188C, two of which are illustrated in FIG. 11, are mounted to the frame 154 and extend downwardly through the frame 154 and anvil 155, such that the respective injection nozzle tips 189A, 189B and 189C project slightly below the planar undersurface of the anvil 155. The injection nozzles 188A, 188B and 188C are positioned so that the tips 189A, 189B and 189C each engage the hemispherical recess 179 of a respective one of the nozzle seats 178A, 178B and 178C when the top surface of the mold 160 is brought into engagement with the undersurface of the anvil 155 by the upward forces generated by the ram element 157.

Figure 13:
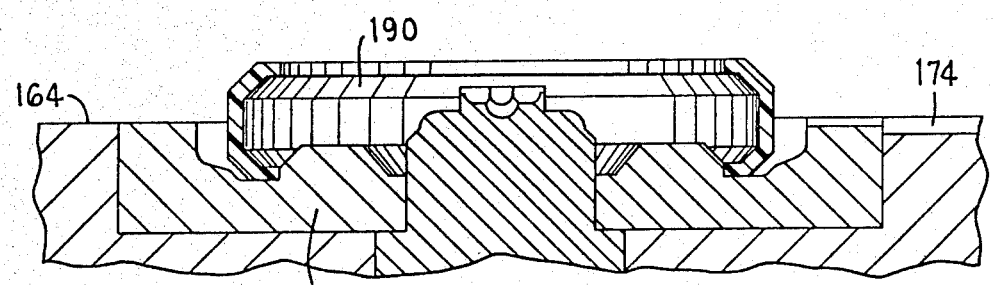
FIG. 13 is a sectional view taken along line XIII—XIII of FIG. 12 with an annulus inserted into the mold cavity.
Figure 14:
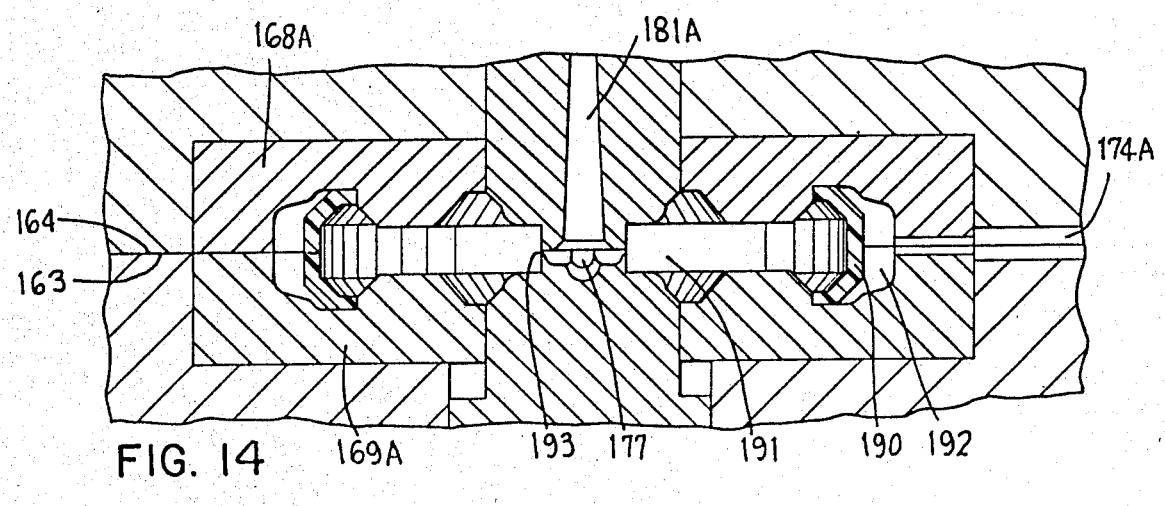
FIG. 14 is an enlarged view of the mold cavity in FIG. 11 with the annulus therein dividing the mold cavity into separate parts.
Figure 12:
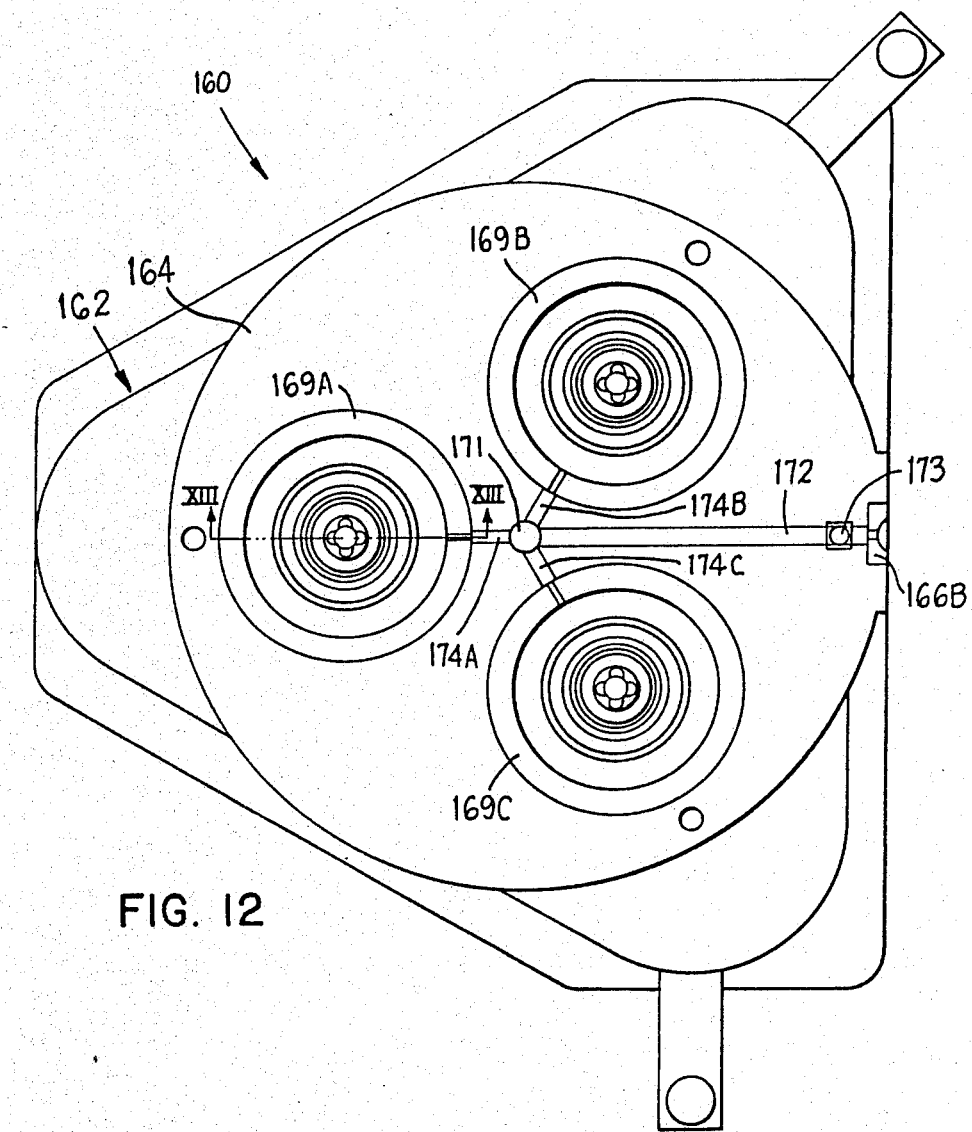
FIG. 12 is a top view of the bottom half of the mold of FIG. 11.

As shown in FIGS. 13 and 14, an annulus 190 can be inserted into the mold cavity which, when the mold parts 161 and 162 are in the closed position, divides the mold cavity into an inner cavity portion 191 and an outer cavity portion 192. The outer cavity portion 192 concentrically encircles the inner cavity portion 191, and there is no fluid communication between the cavity portions 191 and 192. The outer cavity portion 192 is supplied with moldable material by a respective one of the passageways 174 and the inner cavity portion 191 is supplied with moldable material by a respective one of the sprues 177 through a plurality of angularly spaced orifices 193.

The mold cavity illustrated in FIGS. 11 to 14 is adapted to produce a wheel, the moldable material in the inner cavity portion 191 becoming the hub of the wheel, the moldable material in the outer cavity portion 192 becoming the tread of the wheel, and the annulus 190 becoming an integral part of the wheel during the injection molding process and being removed from the mold therewith. It will be recognized, however, that a wide variation in the size and shape of the mold cavity is possible, that an annulus need not necessarily be used, and that the article produced by the injection molding process need not necessarily be a wheel.

Control of the nozzles 158 and 188A to 188C in order to adapt the injection molding operation to the particular characteristics of each mold cavity could be achieved in a manner similar to that described hereinabove for the embodiment of FIGS. 1 to 7, and such control is therefore not illustrated or described in detail here. Specifically, if the mold cavities in each mold are identical in size and shape, an indication of mold cavity characteristics for the control unit which controls the nozzles 158 and 188A to 188C could be achieved with a single set of holes in the table 156 for each mold 160, similar to the holes 44A to 44C in FIGS. 1 and 4. If, on the other hand, each mold cavity in a given mold 160 is to have a different size and shape, four separate sets of such holes could be provided for each mold 160, each set of holes controlling a respective one of the four injection nozzles 158 and 188A to 188C, and four sensor units like the sensor unit 141 could be installed below the table 156 at location A. In either case, the control unit itself could be substantially identical to the circuit of FIG. 9. The portion of the circuit of FIG. 9 which controls the injection nozzle would simply be duplicated for each of the four injection nozzles of FIG. 11 and the entire resulting circuit would be synchronized by a single sequencer like the sequencer 149 of FIG. 9.

OPERATION

Although the operation of the device described above will be understood from the foregoing description by persons skilled in the art, a summary of such operation is now given for convenience. A brief discussion of the operation of the control unit 148 is presented first, in order to facilitate understanding of the subsequent description of system operation.

Figure 10:
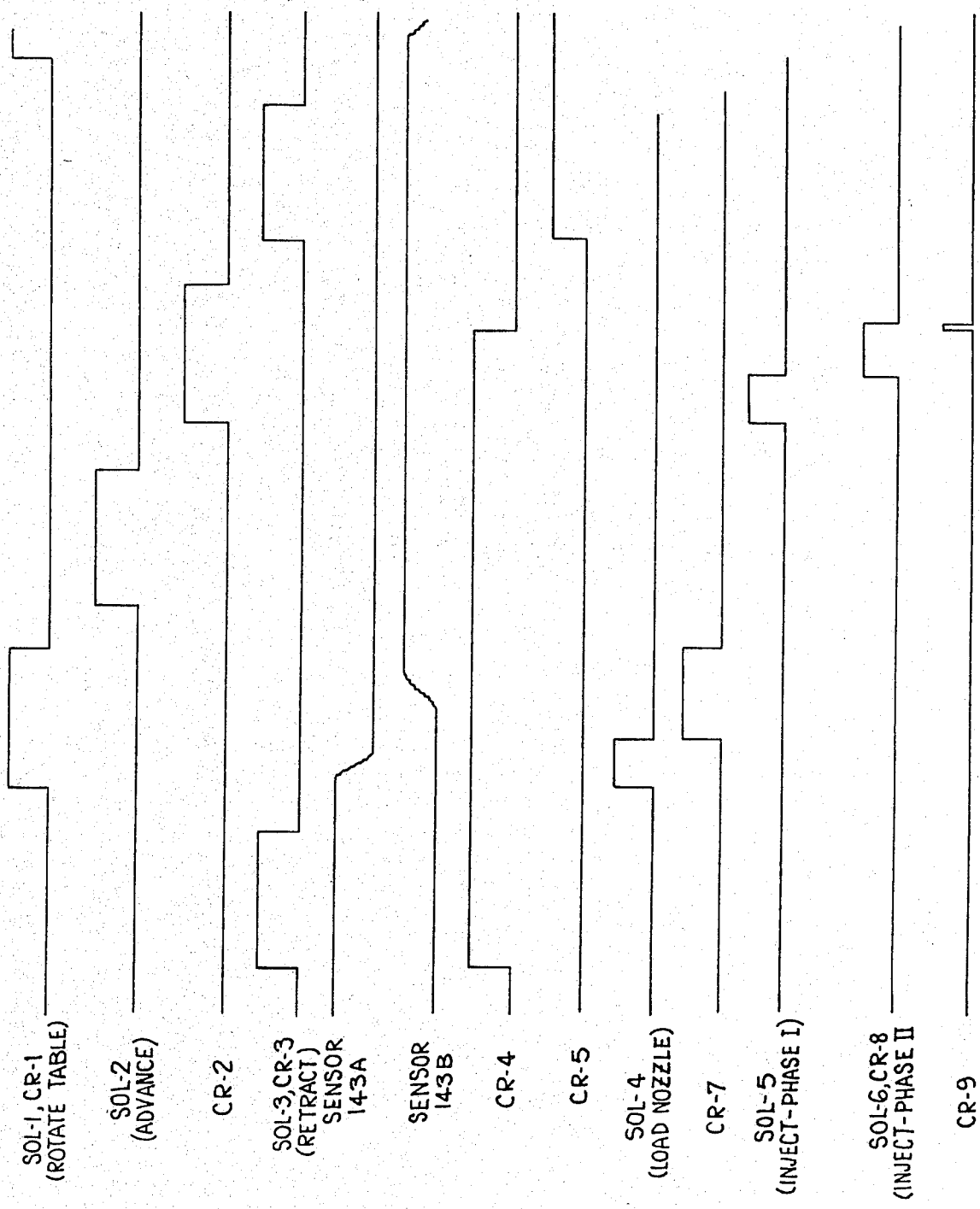
FIG. 10 is a timing diagram illustrating the operation of the exemplary relay circuit of FIG. 9.

Referring to FIGS. 9 and 10, the sequencer 149 sequentially and cyclically energizes solenoid SOL-1 and control relay CR-1, solenoid SOL-2, control relay CR-2, and solenoid SOL-3 and control relay CR-3. At the conclusion of the injection cycle which precedes the injection cycle described below, solenoid SOL-3 is energized by the sequencer 149 to effect retraction of the nozzle 106, retraction of the pistons of hydraulic cylinders 114, 117, 101 and 104, and lowering of the cover lifter 121. At this time, a set of the holes 44A to 44C is positioned at location A above the sensor unit 141 and one of the holes 44A to 44C will have a pin 144 therein to indicate the characteristics of the mold cavity in the mold 46 which is next to be injected, which mold is the one at location L. The associated sensor 143A to 143C will have detected the presence of the pin 144 and will have energized the wire 147 connecting it to the control unit 148, thereby closing the associated contact in a respective one of the relay lines driving control relays CR-4, CR-5 and CR-6 in the circuit of FIG. 9. Assuming for illustration that the pin 144 is in hole 44A and sensor 143A is energizing a signal to the control unit 148, as shown in FIG. 10, the contact designated "Sensor 143A" in the relay line driving CR-4 will be closed. Control relay CR-3 will be energized by the sequencer 149 simultaneously with solenoid SOL-3, at which time control relay CR-4 will be energized and will close the contact labeled CR-4 in the parallel ladder rung or circuit of the same line. Since the state of the sequencer 149 means that control relay CR-9 is necessarily de-energized, the normally closed contact CR-9 in the parallel rung of the line driving relay CR-4 will conduct power and the parallel rung will therefore supply power to control relay CR-4 to latch it in its energized state and it will remain energized even after the pin 144 is no longer above the sensor 143A and the contact associated with sensor 143A has opened. The ladder lines driving control relay CR-5 and CR-6 operate in an identical manner when a signal is received from sensors 143B and 143C, respectively. Each of the control relays CR-4, CR-5 and CR-6 thus corresponds to a particular size and shape of mold cavity and, when energized, indicates that a mold 46 containing such a cavity is about to be or has just been rotated into alignment with the injection nozzle 106. It also controls the injection of moldable material into the mold 46 as described hereinafter.

After a predetermined time period sufficient to retract the nozzle 106, to retract the pistons of hydraulic cylinders 114, 117, 101 and 104, and to lower the cover lifter 121, the sequencer 149 de-energizes solenoid SOL-3 and CR-3 and energizes solenoid SOL-1. When solenoid SOL-1 is energized, it will cause the indexing mechanism 26 to effect a steplike rotational movement of the table 23, moving each of the injection molds 46 from one of the locations A-L (FIG. 1) to the next sequential location. The mold 46 at location L will be moved into alignment with the nozzle 106 at location A. As the table 23 rotates, the pin 144 which was positioned over sensor 143A will be moved away from the sensor unit 141 and the signal from the sensor 143A to the control unit 148 will be de-energized, as shown in FIG. 10. The holes 44A to 44C in the adjacent table sector will then move into position above the sensor unit 141. Assuming the associated pin 144 is in hole 44B in this table sector, sensor 143B will energize a line to the control unit 148, as also shown in FIG. 10. The control unit 148 will ignore the signal, however, until the sequencer 149 again energizes solenoid SOL-3 and control relay CR-3 at the end of the injection cycle. Meanwhile, control relay CR-4 remains energized to indicate the characteristics of the cavity in the mold which has just moved into position at location A.

As shown in FIG. 1, as soon as control relay CR-1 is energized, power will be supplied to solenoid SOL-4 and it will be energized, thereby enabling the loading of the injection nozzle 106 with moldable material at a predetermined rate while the table 23 is indexed. Simultaneously, one of the contacts CR-4, CR-5 and CR-6 in the line driving control relay CR-7 will be closed and power will be selectively supplied to the input of the corresponding time-delay circuit 150A. Following the preset time delay of the selected delay circuit 150A, that delay circuit 150A will energize its output and thereby energize control relay CR-7, which in turn will open the normally closed CR-7 contact in the ladder line driving solenoid SOL-4 and de-energize solenoid SOL-4, as shown in FIG. 10. Thus, the period of time that solenoid SOL-4 is energized will be equal to the preset time delay in the selected time delay circuit 150A and variation of that preset time delay will vary the amount of moldable material loaded into the injection nozzle 106. Typically, the three delay circuits 105A will have different preset times, each selected to load the injection nozzle 106 with the amount of moldable material required to fill the corresponding type of mold cavity.

After a time period sufficient for the indexing mechanism 26 to complete the steplike rotational movement of the table 23, the sequencer 149 will deactivate solenoid SOL-1 and control relay CR-1 and will activate solenoid SOL-2 (FIG. 10). As described hereinabove, solenoid SOL-2 will operate not-illustrated hydraulic valves of conventional design to extend the piston rods of hydraulic cylinders 114 and 117, advance the injection nozzle 106 into engagement with the recess 67 on the injection mold 46 at location A, extend the piston rods of the locking and unlocking cylinders 101 and 104 and raise the cover lifter 121.

The sequencer 149 will then de-energize solenoid SOL-2 and energize control relay CR-2. When control relay CR-2 is energized, power will be conducted to solenoid SOL-5 and will energize it, causing the injection nozzle 106 to inject the charge of moldable material therein into the associated injection mold 46 at a high pressure, typically about 1000 psi. Simultaneously, a selected one of the time delay circuits 150B driving solenoid SOL-6 and control relay CR-8 will be energized and, after its preset time delay has elapsed, will energize its output to effect energization of solenoid SOL-6 and control relay CR-8. This will open the normally closed CR-8 contact in the ladder line driving solenoid SOL-5 and de-energize solenoid SOL-5. Energizing SOL-6 causes the injection nozzle 106 to apply a lower pressure to the moldable material in the mold 46, typically about 500 psi. Thus, solenoid SOL-5 will have been energized for a period of time equal to the preset time delay in the selected time delay circuit 150B. Accordingly, variation of that preset time delay will vary the period of time during which the injection nozzle 106 maintains the higher pressure on the moldable material injected into the mold 46.

When the selected delay circuit 150B energizes SOL-6 and control relay CR-9, it will also energize the input of a selected one of the time delay circuits 150C and, following the preset delay for that delay circuit, CR-9 will be energized and will open the normally closed CR-9 contact in the line driving solenoid SOL-4 to de-energize SOL-4. This will, in turn, open the CR-4 contacts in the relay line driving control relays CR-8 and CR-9 and solenoid SOL-6, de-energizing CR-8, CR-9 and SOL-6, as shown in FIG. 10. Thus, variation in the preset delays of the delay circuits 150C will vary the time period during which the reduced pressure is applied to the moldable material in the mold 46.

Subsequently, the sequencer 149 will de-energize control relay CR-2 and will energize solenoid SOL-3 and control relay CR-3, causing the series of operations just described to repeat.

It will be evident from the foregoing discussion that the delay circuits 150A control the amount of moldable material injected into an injection mold, the delay circuits 150B control the length of time a high pressure is applied to the moldable material to effect injection and packing of the moldable material into the mold cavity, and the delay circuits 150C control the length of time a reduced pressure is applied to the moldable material after injection and packing has taken place. Each sensor element 143A to 143C is associated with a particular size and shape mold cavity and is associated with a respective delay circuit 150A, a respective delay circuit 150B and a respective delay circuit 150C, and the preset time delays for these delay circuits are therefore selected to customize the injection operation to the characteristics of the associated mold cavity.

The operation of the entire system will now be explained by describing the series of operations performed on an arbitrary mold 46 as the table 23 is rotated 360° in a step-by-step manner. One complete cycle of the control unit 148 is required to effect each steplike rotational movement of the table 23 by the indexing mechanism 26, each such cycle being similar to the single cycle described in detail hereinabove.

The operation of the control unit 148 will not be set forth again hereinbelow, but it will be recognized from the foregoing description of operation of the control unit 148 that it controls all steps of system operation discussed below.

Following a steplike rotational movement of the table 23 by the indexing mechanism 26 in the direction T, one of the injection molds 46 will be positioned at location L of FIG. 1. The holes 44 associated with the mold 46 at location L will be positioned above the sensor unit 141 located beneath the table 23 at location A. A pin 144 (FIG. 4) will be located in the hole 44 corresponding to the style of cavity plate 56 and 57 installed in the mold 46 at location L. The presence of the pin 144 will disrupt the magnetic field established by the corresponding sensor 143 and a signal will be sent on the wires 147 to the control unit 148 as described in detail hereinabove, and the control unit 148 will sense and record the position of the pin 144 in the manner described hereinabove.

The indexing mechanism 26 will then initiate another steplike rotational movement of the table 23, and as the mold 46 moves from location L to location A, the control unit 148 will initiate loading of the nozzle 106 with a quantity of moldable material which corresponds to the characteristics of the cavity plates 56 and 57 in the mold 46.

When the mold 46 has been positioned at location A, the piston rod 113 (FIG. 5) of the hydraulic cylinder 114 will be extended, causing the wedge 112 to act on the inclined surface 111 of the anvil 109 and move the anvil 109 vertically upward. As the anvil 109 moves vertically upward, it will contact the bottom of the sector 37 of the table 23 on which the mold 46 is mounted and will deflect the sector 37 a small distance upwardly out of the plane of the table 23. The movement of the piston rod 113 is stopped at a predetermined point corresponding to the desired vertical position of the anvil 109 at which the axis of the nozzle seat recess 67 on the mold 46 is precisely aligned with the axis of the nozzle 106 of the injection molding machine. The piston ram 116 of the hydraulic cylinder 117 above the mold 46 will be extended downwardly until it contacts the top of the mold, such that the upper and lower mold parts 47 and 48 are tightly clamped together between the anvil 109 and the ram 116. The piston rod 102 of the hydraulic locking cylinder 101 will be extended by the control unit 148, and the Y-shaped element 103 on the piston rod 102 will trap the vertical pin 99 on the locking handle 96 of the mold 46 and rotate the locking handle 96 counterclockwise to activate the locking mechanism 81 in the injection mold 46. The nozzle 106 will simultaneously be extended toward the mold 46 until the nozzle 106 is firmly received in the nozzle seat recess 67. The control unit 148, acting on the signal received from the sensor unit 141 indicating the characteristics of the mold cavity 54 in the mold 46, will then inject the predetermined quantity of moldable material through the nozzle 106 into the passageway 68 at a high pressure, typically 1000 psi, and maintain that pressure for a period of time determined by the characteristics of the mold cavity 54. The control unit 148 will then cause the nozzle 106 to maintain the moldable material in the mold 46 at a lower pressure, typically 500 psi, for another period of time which is also determined by the characteristics of the mold cavity 54. The pressure of the moldable material in the passageway 68 during injection will act on the inclined surface 76 of the shut-off pin 72 to create downward forces on the shut-off pin 72, forcing the pin downwardly against the urging of the spring 74 and permitting the moldable material to pass through the passageway 68 into the mold cavity 54. After the mold cavity 54 has been filled and pressure from the nozzle 106 is terminated, the spring 74 will return the shut-off pin 72 to its original position blocking the passageway 68. After the injection of moldable material is completed, the nozzle 106 will be retracted from the nozzle recess 67 by the control unit 148, the piston rod 102 of the locking cylinder 101 will be retracted, the ram 116 will be raised and the hydraulic cylinder 114 will retract the wedge 112 to lower the anvil 109.

The indexing mechanism 26, under control of the control unit 148, will subsequently effect an indexing of the table through successive steps to bring the mold 46 to positions B, C, D, E, F, G, H, I and eventually to position J. During this period of time, the moldable material in the mold cavity 54 will be congealing or curing and the speed of the indexing mechanism 26 is preferably adjusted so that at position J the moldable material will be cured sufficiently to permit its removal from the mold 46.

At position J, the control unit 148 will operate the hydraulic unlocking cylinder 104 in a manner similar to the cylinder 101 to effect a clockwise rotation of the unlocking handle 97 to disengage the locking mechanisms 81 in the injection mold 46.

The indexing mechanism 26 will then rotate the injection mold to location K. At location K, the upper mold part 47 of the injection mold 46 will have moved into the position of engagement with the cover lifter 121 shown in FIGS. 6 and 7. In particular, each roller 130 will be firmly disposed against a side surface of the upper mold part 47 just beneath the downwardly facing lip 53 defined by the top plate 52. The entire cover lifter 121 will then be raised vertically by the hydraulic cylinder piston rod 138 attached to the top wall 123 of the cover lifter 121 under control of the control unit 148. As the rollers 130 move vertically with the cover lifter 121, they will contact the lip 53 of the upper mold part 47 and thereby lift the upper mold part 47 vertically away from the lower mold part 48. Separation of the upper mold parts 47 and 48 will result in separation of the associated mold cavity plates 56 and 57 and will permit the article of cured moldable material to be removed from the mold cavity 54. In the illustration of FIG. 3, the cured material would be an annulus surrounding the hub 61 of a wheel. Thereafter, a new wheel hub 51 (FIG. 3) would be placed in the mold cavity 54. Then, the control unit 148 causes the hydraulic cylinder piston rod 138 to lower the cover lifter 121 to its original position, as shown in FIG. 6, in which the upper and lower mold parts 47 and 48 are in the closed position. For further details of one type of wheel manufacturable utilizing this apparatus, refer to U.S. Pat. Nos. 4,295,686 and 4,294,491. Reference to these patents is to be incorporated herein.

Further rotation of the table 23 by the control unit 148 and the indexing mechanism 26 will move the upper mold part 47 of the injection mold 46 out of engagement with the cover lifter 121. The mold is then rotated to location L and the injection molding cycle described hereinabove is repeated.

The operation of an injection molding machine with the embodiment of FIG. 8 is substantially identical to that just described with only the following difference. When the injection mold 46 has been rotated into position at location A (FIG. 1), the ram element 152 on the piston rod of the hydraulic cylinder 153 will be extended upwardly, will contact the bottom of the sector 37 of the table 23 on which the mold 46 is mounted and will deflect the sector 37 upwardly a short distance out of the plane of the table 23 until the top of the injection mold 46 is firmly abutting against the stationary anvil 151. The injection nozzle 106 is positioned relative to the anvil 151 so that it is precisely aligned with the nozzle seat recess 67 on a mold 46 that is firmly abutted against the anvil 151. The injection nozzle 106 will be extended and the injection operation will take place in the manner described hereinabove, after which the ram 152 on the piston rod of the cylinder 153 will be lowered until the sector 37 of the table 23 has returned to its normal position and the ram 152 is spaced a short distance beneath the table 23.

The operation of the embodiment illustrated in FIGS. 11 to 14 is substantially identical to that just described except as otherwise set forth hereinafter. When the injection mold 46 has been rotated into position at location A (FIG. 1), the ram element 157 will be extended upwardly, will contact the bottom of the sector of the table 156 on which the mold 160 is mounted and will deflect the sector upwardly a short distance out of the plane of the table 156 until the top of the injection mold 46 is firmly abutting the undersurface of the stationary anvil 55. The tips 189A, 189B and 189C of the injection nozzles 188A, 188B and 188C will each be firmly engaged in the hemispherical recess of a respective one of the nozzle seats 178A, 178B and 178C. The injection nozzle 158 will then be aligned with the nozzle seat 166 and will be extended until it is firmly received in the recess of the nozzle seat 166. The nozzle 158 will then inject moldable material through the passageway 172, the chamber 171 and the passageways 174A to 174C into the outer cavity portions 192 of the respective mold cavities in the mold 160. The injection nozzles 188A, 188B and 188C will inject moldable material through the respective passageways 181, sprues 177 and orifices 193 into the inner cavity portions 191 of the respective mold cavities in the mold 160. Preferably, injection nozzles 158 and 188A to 188C all inject moldable material substantially at the same time, but it will be recognized that the nozzles 158, 188A, 188B and 188C could be controlled so as to effect injection in any desired sequence.

When the injection operations have all been completed, the injection nozzle 158 will be retracted and the ram element 157 will be lowered until the table 156 has returned to its normal position and the ram element 157 is spaced a short distance beneath the table 156.

The preferred control unit for the embodiment of FIGS. 11 to 14 is, as described hereinabove, similar to that illustrated in FIG. 9 but with certain portions duplicated to provide independent control of the four injection nozzles. The operation of the circuit would therefore be substantially identical to that set forth hereinabove in connection with FIG. 9 and is not set forth in detail here.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mold top lifting apparatus for lifting a mold top generally upwardly away from a position adjacent a mold bottom to a position spaced from said mold bottom, said mold top having generally vertical first and second side surfaces facing outwardly on opposite sides thereof and having means defining a downwardly facing lip at the top of each said side surface, comprising:
   movable support means supporting said mold bottom and first drive means for effecting movement of said support means in a generally horizontal direction approximately perpendicular to the directions in which said side surfaces on said mold top face;
   movable frame means and second drive means for effecting generally vertical movement of said frame means between a first position and a second position above said first position; and
   first and second gripping means on said frame means which are spaced horizontally in a direction approximately perpendicular to said direction of movement of said support means, movement of said support means when said frame means is in said first position causing said mold top to move to a position in which said mold top is between said first and second gripping means and said first and second gripping means are respectively engaging said side surfaces thereon, and subsequent movement of said frame means from said first toward said second position thereof causing said mold top to be lifted upwardly away from said mold bottom due to engagement of said gripping means with said lips on said mold top;
   wherein said first and second gripping means respectively include first and second roller support members supported on said frame means for pivotal movement about respective substantially vertical pivot axes, wherein said first gripping means includes two first rollers supported on said first roller support member on opposite sides of said pivot axis thereof for rotation about respective substantially vertical axes, and wherein said second gripping means includes two second rollers supported on said second roller support member on opposite sides of said pivot axis thereof for rotation about respective substantially vertical axes, said mold top passing between said first and second roller support members as said support means moves and said first rollers and said second rollers respectively rolling firmly across said first and second side surfaces on said mold top just below said lips thereon.

2. The apparatus according to claim 1, wherein said first and second gripping means include a vertical stabilizing pin provided at each end of each said roller support member, a sleeve rotatably supported on each said stabilizing pin, a stabilizing rod attached to each said sleeve and extending away from the mold top disposed between said first and second gripping means through respective openings provided in said frame means, nut means threadedly engaging each said stabilizing rod at a location spaced from said frame means on a side of said frame means remote from the associated roller support member, and a helical spring disposed around each said stabilizing rod and extending between said frame means and said nut means for continuously urging said nut means away from said frame means.

3. The apparatus according to claim 2, wherein:
   said frame means includes a substantially C-shaped frame having a horizontal top wall, to vertical side walls extending downwardly from opposite edges of said top wall, and an inwardly extending flange at the bottom of each said side wall;
   said first and second gripping means each include a vertically extending pivot pin which is spaced inwardly from a respective said side wall of said frame and extends between the associated flange and the top wall;
   each said roller support member is pivotally supported on a respective said pivot pin, extends substantially parallel to said side walls of said frame, and includes a pair of parallel, vertically spaced bars disposed on opposite sides of the rollers supported thereon, said stabilizing pins each extending between and being secured to the associated bars;
   said openings in said frame through which said stabilizing rods extend are provided in said side walls of said frame;
   said stabilizing rods extend substantially horizontally; and
   said second drive means for effecting reciprocal vertical movement of said frame means is a fluid actuated cylinder.

4. The apparatus according to claim 2, wherein said support means includes a generally horizontal table supported for rotation about a generally vertical pivot axis, said mold bottom being supported on an upper surface of said table at a location spaced radially from said pivot axis thereof, and wherein said first drive means effects rotation of said table about its pivot axis.

5. The apparatus according to claim 1, wherein said first and second surfaces on said mold top are generally convex surfaces.

6. The apparatus according to claim 1, wherein said first and second gripping means include resilient means for yieldably resisting pivotal movement of said first and second roller support members in either direction away from initial positions thereof.

* * * * *

UNITED STATES PATENT AND TRADEMARK OFFICE
CERTIFICATE OF CORRECTION

PATENT NO. : 4 537 570

DATED : August 27, 1985

INVENTOR(S) : John W. Black, Richard D. Shupe and Earl Simon

It is certified that error appears in the above-identified patent and that said Letters Patent is hereby corrected as shown below:

Column 18, line 45; change "2" to ---1---.

Signed and Sealed this

Eleventh Day of February 1986

[SEAL]

Attest:

DONALD J. QUIGG

Attesting Officer

Commissioner of Patents and Trademarks